(12) United States Patent
Seo et al.

(10) Patent No.: US 12,491,151 B2
(45) Date of Patent: Dec. 9, 2025

(54) COSMETIC COMPOSITION COMPRISING BLACK YEAST-DERIVED EXOSOMES

(71) Applicants: EXOCOBIO INC., Cheongju-si (KR); LG HOUSEHOLD & HEALTH CARE LTD., Seoul (KR)

(72) Inventors: Ji Hyun Seo, Seoul (KR); So Young Lee, Seoul (KR); Mu Hyun Jin, Seoul (KR); Sung Hun Youn, Seoul (KR); Byong Seung Cho, Gunpo-si (KR); Yu Jin Won, Seoul (KR)

(73) Assignees: EXOCOBIO INC., Cheongju-si (KR); LG HOUSEHOLD & HEALTH CARE LTD., Seoul (KR)

( * ) Notice: Subject to any disclaimer, the term of this patent is extended or adjusted under 35 U.S.C. 154(b) by 351 days.

(21) Appl. No.: 18/547,384

(22) PCT Filed: Feb. 22, 2022

(86) PCT No.: PCT/KR2022/002582
§ 371 (c)(1),
(2) Date: Aug. 22, 2023

(87) PCT Pub. No.: WO2022/177406
PCT Pub. Date: Aug. 25, 2022

(65) Prior Publication Data
US 2024/0130958 A1 Apr. 25, 2024
US 2024/0225994 A9 Jul. 11, 2024

(30) Foreign Application Priority Data
Feb. 22, 2021 (KR) .................. 10-2021-0023575

(51) Int. Cl.
*A61K 8/9728* (2017.01)
*A61Q 19/00* (2006.01)
*A61Q 19/02* (2006.01)
*A61Q 19/08* (2006.01)

(52) U.S. Cl.
CPC .......... *A61K 8/9728* (2017.08); *A61Q 19/007* (2013.01); *A61Q 19/02* (2013.01); *A61Q 19/08* (2013.01)

(58) Field of Classification Search
CPC .................................................. A61K 8/9728
See application file for complete search history.

(56) References Cited

FOREIGN PATENT DOCUMENTS

| CN | 111225659 A | 6/2020 |
|---|---|---|
| KR | 10-2015-0028201 A | 3/2015 |
| KR | 2015028201 A * | 3/2015 |
| KR | 10-1895916 B1 | 9/2018 |
| KR | 10-2019-0058344 A | 5/2019 |
| KR | 10-2075849 B1 | 2/2020 |
| KR | 10-2020-0028290 A | 3/2020 |
| KR | 10-2020-0053968 A | 5/2020 |
| WO | 2020/158930 A1 | 8/2020 |

OTHER PUBLICATIONS

"Bubble Cleanser", XP093231305, 3 pages, 2020.
"Concentrate Signature Cream", XP093231313, 8 pages, 2020.
"7-in-1 Miracle Skin Mask Pads 7-Second Morning Mask", XP093231320, 7 pages, 2020.
"Intense Hydration Mask", XP093231327, 3 pages, 2019.
"Wink Wink 5 Minute AM/PM Eye Gels", XP093231332, 3 pages, 2019.
"Brightening Energy Fermentation Mask", XP093231345, 3 pages, 2017.
Office Action from corresponding JP 2023-575334, issued Oct. 7, 2024, 7 pages.
All In One Fluid EX, MintelGNPD, 5 pages, Oct. 7, 2024.
All Eyes On You Set, MintelGNPD, 4 pages, Oct. 7, 2024.
Concentrate Signature Cream Light, MintelGNPD, 7 pages, Oct. 7, 2024.
Micro Balancing Essence, MintelGNPD, 6 pages, Oct. 7, 2024.
Ultra Royal Leaf Mask, MintelGNPD, 3 pages, Oct. 7, 2024.

* cited by examiner

*Primary Examiner* — Qiuwen Mi
(74) *Attorney, Agent, or Firm* — Vorys, Sater, Seymour and Pease LLP; Mih Suhn Koh (57) ABSTRACT

Provided is a method of improving skin condition by applying to the skin of a subject a cosmetic composition comprising black yeast-derived exosomes as an active ingredient and thereby improving the skin condition, particularly skin elasticity improvement, skin wrinkle reduction, skin texture improvement, skin tone improvement, skin brightness improvement, skin regeneration, skin moisturization, and/or whitening.

15 Claims, 5 Drawing Sheets

COSMETIC COMPOSITION COMPRISING BLACK YEAST-DERIVED EXOSOMES

TECHNICAL FIELD

The present invention relates to a cosmetic composition for skin elasticity improvement, skin wrinkle improvement, skin texture improvement, skin tone improvement, skin brightness improvement, skin regeneration, skin moisturizing, and/or whitening, which includes *Aureobasidium pullulans*-derived exosomes as an active ingredient.

BACKGROUND ART

As skin ages, skin elasticity decreases, and skin wrinkles increase. The decrease in skin elasticity and the formation of skin wrinkles are known to be caused by a decrease in collagen synthesis and promotion of the expression of a matrix metalloproteinase (MMP), which is an enzyme that degrades collagen.

As substances known to be effective in skin wrinkle improvement, there are adenosine, retinoic acid, and the like, but adenosine has insignificant clinical efficacy, and retinoic acid cannot be used for women of childbearing age and has side effects such as erythema and the like. Accordingly, functional cosmetics for preventing skin aging, which use plants or natural substances as active ingredients, have recently attracted attention. However, functional cosmetics including plant extracts as active ingredients have problems in that a foreign body sensation may be caused when the solution evaporates after application onto the skin and that the duration of the effect is short.

Melanin, which determines human skin color, is produced in melanocytes. Specifically, melanin is a dark brown pigment formed by oxidation and polymerization of a substrate, tyrosine, which is an amino acid present in vivo, by an enzyme such as tyrosinase present in melanocytes. The melanin thus formed migrates to epidermal cells called keratinocytes through the dendrites of melanocytes. The melanin having migrated to keratinocytes can be removed by being shed from the skin when keratinocytes are shed from the epidermis. But as there is no enzyme that degrades melanin in vivo, once formed melanin does not degrade in vivo. Therefore, it is important to suppress the production of melanin to brighten the skin.

The need for research on brightening agents as cosmetics is gradually increasing as the standard of living in the Orient, where bright skin is emotionally preferred, has recently been enhanced and skin blackening is recognized as a skin aging phenomenon caused by ultraviolet (UV) rays. Accordingly, substances that exhibit tyrosinase inhibitory activity, such as ascorbic acid, hydroquinone, glutathione, arbutin, and the like, have been used in cosmetics or drugs. However, since most of the substances have insufficient effects or are unstable in formulation, the utilization thereof is poor. Particularly, compounds such as hydroquinone exhibit a strong depigmentation action, however, have side effects such as skin allergies caused by inherent skin sensitization, vitiligo caused by altering normal skin function, and the like, and therefore, the use thereof is limited in terms of skin safety.

Skin, which is the primary protective barrier of the human body, preserves moisture in the body while preventing excessive moisture release and protects the human body from various external stimuli (chemicals, air pollutants, dry environment, UV rays, and the like). Skin is largely composed of the epidermis, dermis, and subcutaneous fat, and the epidermis is subdivided into the stratum corneum, stratum granulosum, stratum spinosum, and stratum basale. When the stratum corneum of the epidermis, composed of keratinocytes and lipid membranes between keratinocytes, is formed normally, the protective function of skin can be maintained. Due to the moisture trapping function of keratinocytes and the moisture loss prevention function of lipid membranes between keratinocytes, human skin can maintain a moisture content of about 30%.

In human keratinocytes, aquaporin 3 (AQP3), which is a transmembrane protein that transports moisture and glycerol into cells, is expressed. AQP3 is a protein that regulates the intercellular movement of water and glycerol, and it is found that the skin barrier is damaged and the elasticity and moisture holding capacity of skin are decreased in a mouse model in which the expression of the AQP3 gene is suppressed.

In addition, hyaluronic acid is the natural skin moisturizing factor and is an important substrate for holding moisture in the epidermal layer. Hyaluronan synthase 2 (HAS2) and hyaluronan synthase 3 (HAS3), which are hyaluronic acid synthetases, are expressed in the skin epidermis and sometimes used as indicators to evaluate the skin's moisturizing ability.

In recent years, as the moisture content of the stratum corneum is reduced due to a change in environment or life patterns, various stresses generated in social life, environmental pollution, frequent face washing caused by a makeup habit, and the like, the skin becomes dry, has a rough surface, loses luster, and thus looks dark and dull. Accordingly, the importance of skin moisturizing issues is increasing.

Therefore, there is a need to develop a new cosmetic material which has excellent skin condition improvement effects such as skin wrinkle improvement, skin elasticity improvement, skin texture improvement, skin tone improvement, skin brightness improvement, skin regeneration, skin whitening, and/or skin moisturizing, has no side effects, and is easy to use.

Meanwhile, some studies have recently shown that the cell secretome contains various bioactive factors that regulate cell behavior, and particularly, "exosomes" having intercellular signaling functions are contained in the cell secretome, and therefore, research on the components and functions thereof are being actively conducted.

Cells release various membrane-type vesicles into the extracellular environment, and the released vesicles are commonly called extracellular vesicles (EVs). EVs are also called cell membrane-derived vesicles, ectosomes, shedding vesicles, microparticles, exosomes, and the like, and in some cases, are differentiated from exosomes.

Exosomes are vesicles that comprise a double phospholipid membrane identical to the structure of a cell membrane and have a size of several tens to several hundreds of nanometers, and proteins, nucleic acids (mRNA, miRNA, and the like), and the like, which are called exosomal cargo, are contained in the exosomes. The exosomal cargo contains a wide range of signaling factors, and these signaling factors are known to be cell type-specific and differently regulated according to the environment of secretory cells. Exosomes are intercellular signaling mediators secreted by cells, and various cell signals transmitted by the exosomes are known to regulate cell behavior including activation, growth, migration, differentiation, dedifferentiation, apoptosis, and necrosis of target cells. Exosomes contain specific genetic materials and bioactive factors according to the nature and condition of derived cells. Proliferating stem cell-derived exosomes regulate cell behavior such as cell migration, proliferation, and differentiation, and recapitulate the characteristics of stem cells related to tissue regeneration (Nature Review Immunology 2002 (2) 569-579).

In other words, exosomes, called avatars of cells, contain bioactive factors such as growth factors like cells, and the exosomes act as carrier that transports bioactive factors between cells, that is, they play a role in cell-to-cell communication. Exosomes are known to be released from not only animal cells such as stem cells, immune cells, fibroblasts, cancer cells, and the like but also cells of various organisms such as plants, bacteria, fungi, algae, and the like.

*Aureobasidium pullulans* is an imperfect fungus widely present in nature, produces melanin pigment, and mass-produces β-1,3-1,6-glucan in addition to the fungus body depending on culture conditions. *Aureobasidium pullulans* has optimum growth at 30° C. and grows between 10° C. and 35° C. Pullulan, which is a polysaccharide polymer produced by *Aureobasidium pullulans*, is used to impart physical properties to jelly and the like in the food industry. Also, new food in which liquid food is input into pullulan films is being developed. *Aureobasidium pullulans*-derived β-glucan, which is an extracellular polysaccharide biosynthesized in a medium, does not require purification and is water-soluble, and thus the processing thereof is easy.

Therefore, *Aureobasidium pullulans* is widely used in the fields of food and cosmetics. However, research on the isolation, purification and characterization of *Aureobasidium pullulans*-derived exosomes is still incomplete. Therefore, there is a need for more detailed characterization and functional studies of *Aureobasidium pullulans*-derived exosomes.

Cosmetics using the fermentation product or culture medium of microorganisms have been introduced, but some fermentation products or culture media may cause side effects such as skin trouble, skin redness, dermatitis, and the like in people with sensitive skin.

Meanwhile, the contents described in the above background art are merely provided to help in understanding the background of the present invention, and thus it should be understood that the contents are not cited as an admission that they can be used as the related art of the present invention.

DISCLOSURE

Technical Problem

Under the above circumstances, the present inventors have studied to develop a cosmetic composition having improved effects compared to an *Aureobasidium pullulans* fermentation product or an *Aureobasidium pullulans* culture medium, and found that *Aureobasidium pullulans*-derived exosomes have excellent skin elasticity improvement, skin wrinkle improvement, skin texture improvement, skin tone improvement, skin brightness improvement, skin regeneration, skin moisturizing, and skin whitening effects. Based on this fact, the present invention was completed.

Therefore, the present invention is directed to providing a cosmetic composition for improving skin conditions, which includes *Aureobasidium pullulans*-derived exosomes as an active ingredient.

Technical Solution

One aspect of the present invention provides a cosmetic composition for improving skin conditions, which includes *Aureobasidium pullulans*-derived exosomes as an active ingredient.

As used herein, the term "*Aureobasidium pullulans*" is a fungus belonging to the Genus *Aureobasidium* and is a unicellular organism that has no hypha and does not have motility and photosynthetic capacity. *Aureobasidium pullulans* is an imperfect fungus widely present in nature, produces melanin pigment, and mass-produces β-1,3-1,6-glucan in addition to the fungus body depending on culture conditions.

As used herein, the term "exosomes" refers to nano-sized vesicles with a membrane structure, which are secreted or released from *Aureobasidium pullulans* into the extracellular space, and are also defined as exosome-like vesicles or exosome-like particles.

As used herein, the term "*Aureobasidium pullulans*-derived exosomes" encompasses, for example, all exosomes isolated from an *Aureobasidium pullulans* culture medium, from an *Aureobasidium pullulans* fermentation product, or from a biological solution of *Aureobasidium pullulans* equivalent thereto, or secreted and/or released from *Aureobasidium pullulans* itself. Various *Aureobasidium pullulans* strains, which are used in the art or may be used in the future, may be used to produce *Aureobasidium pullulans*-derived exosomes, an *Aureobasidium pullulans* strain used in an embodiment should be understood as an example of an *Aureobasidium pullulans* strain that may be used in the present invention, and the present invention is not limited thereto.

As used herein, the term "skin condition improvement" refers to an action of reducing the degree of symptoms associated with deterioration of the condition of the skin, and the skin condition may be a parameter related to skin elasticity, skin wrinkles, skin texture, skin tone, skin brightness, skin regeneration, skin whitening, and skin moisturizing.

Specifically, "skin elasticity improvement" refers to an action of contracting sagging skin tissue by increasing the volume of skin adipose tissue, such as promoting collagen synthesis and an action of maintaining or increasing skin elasticity.

In addition, "skin wrinkles" refers to fine lines generated by skin aging and may be caused by genes, reduction of collagen and elastin present in the skin dermis, an external environment, and the like. Therefore, as used herein, the term "skin wrinkle improvement" refers to an action of suppressing or inhibiting the formation of wrinkles on the skin or alleviating wrinkles that have already formed.

Meanwhile, as used herein, the term "skin tone" refers to a state in which the skin color is dark or light, and "skin tone improvement" refers to an action of making non-uniform skin tone uniform. "Skin whitening" and "skin brightness improvement" include an action of increasing the brightness of the skin whose brightness has decreased due to excessive pigments such as melanin or maintaining the brightness of the skin at a certain level.

In addition, "skin regeneration" refers to an action of restoring skin tissue damaged by external and internal causes of the skin. Examples of the external causes include ultraviolet rays, external contaminants, wounds, trauma, and the like, and examples of the internal causes include diseases, stress, and the like. "Skin moisturizing" refers to an action of inhibiting or suppressing a decrease in moisture in the skin or increasing the moisture content of the skin to smooth the skin surface and impart luster.

Figure 2:
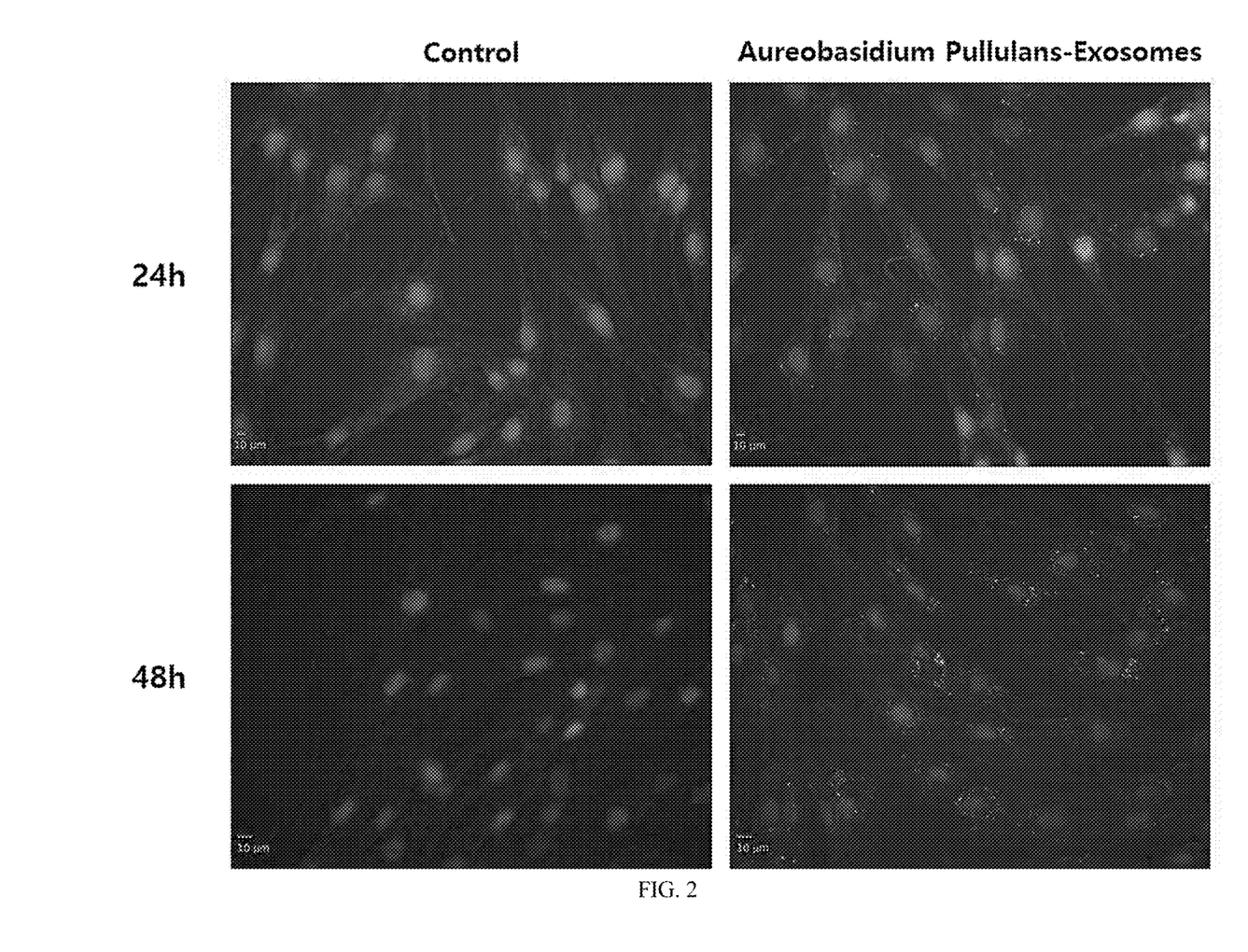
FIG. 2 is a cell fluorescence micrograph showing that fluorescently stained *Aureobasidium pullulans*-derived exosomes are delivered into human dermal fibroblasts (green: exosomes delivered into cells, blue: cell nuclei).
Figure 3:
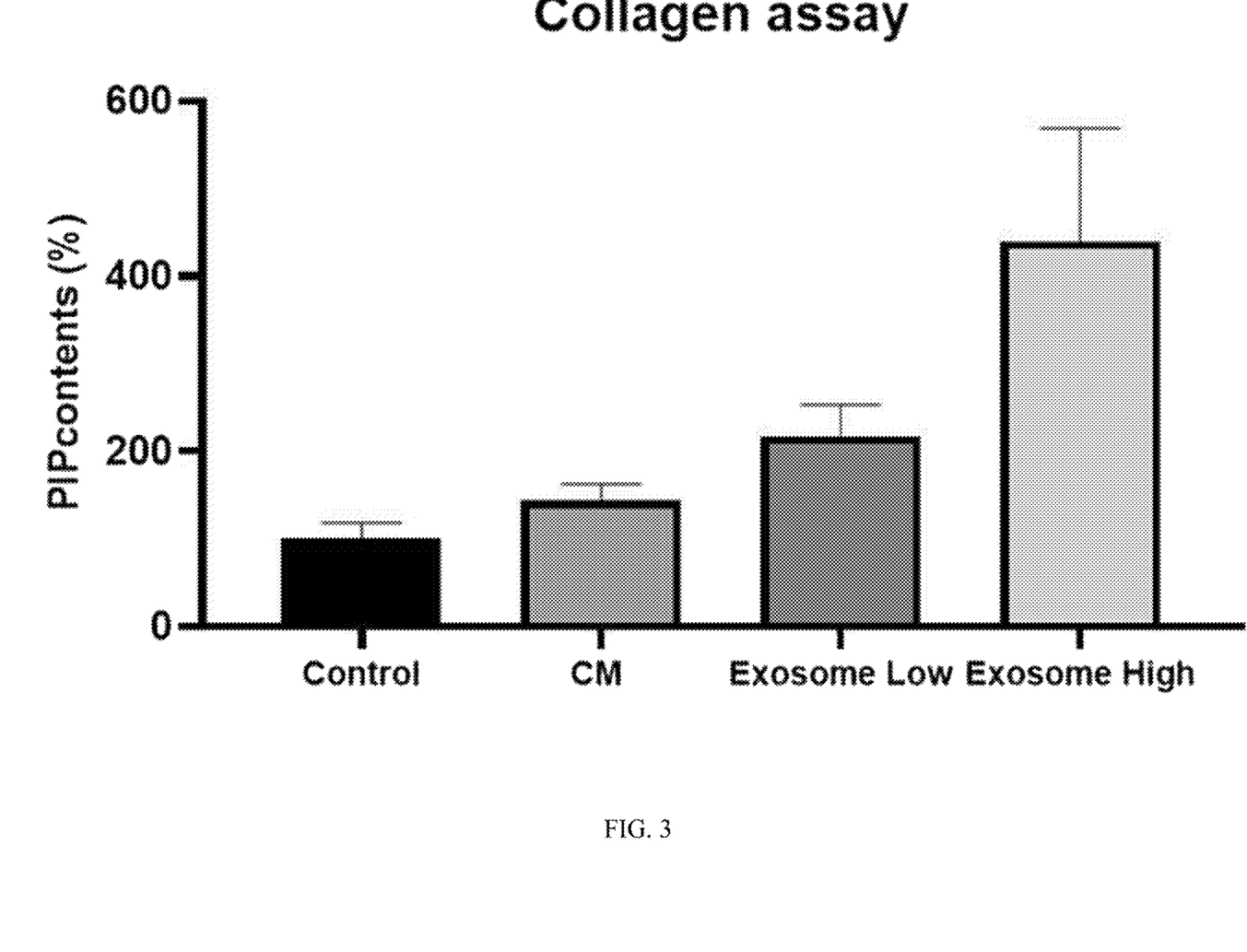
FIG. 3 is a graph showing a relative collagen amount after treatment of human dermal fibroblasts with low and high concentrations of *Aureobasidium pullulans*-derived exosomes.

As can be seen in examples described later, the *Aureobasidium pullulans*-derived exosomes are delivered into skin fibroblasts (FIG. 2) and increase collagen synthesis (FIG. 3). Also, the *Aureobasidium pullulans*-derived exosomes suppress melanin production in melanoma cells (FIG. 5) and promote hyaluronic acid synthetase or aquaporin synthesis.

Therefore, the cosmetic composition including *Aureobasidium pullulans*-derived exosomes can exhibit one or more effects selected from the group consisting of skin elasticity improvement, skin wrinkle improvement, skin texture improvement, skin tone improvement, skin brightness improvement, skin regeneration, skin whitening, and skin moisturizing.

Meanwhile, the cosmetic composition for improving skin conditions according to the present invention may be prepared in at least one form selected from the group consisting of a lotion, a liquid, a cream, a saturated mask, a gel, an aerosol, and a powder.

The lotion refers to a formulation made in a mucus form after the active ingredient of the cosmetic composition is mixed with an emulsifier and the like to homogenize an oil-based ingredient and an aqueous ingredient, and the cream refers to a formulation made in a semi-solid form after the active ingredient of the cosmetic composition is mixed with an emulsifier and the like to homogenize an oil-based ingredient and an aqueous ingredient. Also, the liquid refers to a formulation made in a liquid form by dissolving the active ingredient of the cosmetic composition and other ingredients in a solvent, and the gel refers to a formulation made in a semi-solid form composed of liquid-penetrated organic molecules having a high molecular weight.

The saturated mask refers to a formulation made by saturating a support such as a non-woven fabric with a lotion, a cream, a liquid, a gel, or the like and may be made into a patch, a facial mask, a sheet mask, or the like. The aerosol refers to a formulation made to be sprayed in the form of a mist, foam, or the like using the pressure of a propellant (liquefied gas, compressed gas, or the like) filled in the same container or another container. Also, the powder refers to a formulation made in the form of a homogeneous powder or fine granules, and an excipient or the like may be used.

For example, the cosmetic composition for improving skin conditions according to the present invention may be prepared in the form of a lotion or a cream or may be applied to or saturated into at least one surface of a patch, a facial mask, or a sheet mask.

Meanwhile, the cosmetic composition for improving skin conditions according to the present invention is used for the purposes such as skin elasticity improvement, skin wrinkle improvement, skin texture improvement, skin tone or skin brightness improvement, skin regeneration, skin moisturizing, and/or skin whitening and may be prepared in any formulation typically manufactured in the art. For example, the cosmetic composition may be prepared in the form of a patch, a facial mask, a sheet mask, a skin softening toner, a nutritional skin toner, an astringent toner, a nourishing cream, a massage cream, an eye cream, a cleansing cream, an essence, an eye essence, a cleansing lotion, a cleansing foam, cleansing water, a sunscreen, a lipstick, a soap, a shampoo, a surfactant-containing cleanser, a bath additive, a body lotion, a body cream, a body oil, a body essence, a body cleanser, a hair dye, a hair tonic, or the like, but the present invention is not limited thereto.

Meanwhile, the cosmetic composition for improving skin conditions according to an embodiment of the present invention may further include ingredients typically used in a cosmetic composition, for example, a moisturizer, an antioxidant, an oil-based ingredient, an ultraviolet (UV) absorbent, an emulsifier, a surfactant, a thickener, an alcohol, a powder, a colorant, an aqueous ingredient, water, various skin nutrients, and the like, within a range which does not hinder the effects of the present invention, as needed.

In addition to the *Aureobasidium pullulans*-derived exosomes, the cosmetic composition for improving skin conditions according to an embodiment of the present invention may be used in combination with a conventionally used skin enhancer, antioxidant, and/or moisturizer within a range which does not hinder the effects (skin elasticity improvement, skin wrinkle improvement, skin texture improvement, skin regeneration, skin moisturizing, skin tone or skin brightness improvement, skin whitening, skin care, and the like). For example, the *Aureobasidium pullulans*-derived exosomes of the present invention may be loaded or mixed with at least one of a hydrogel, hyaluronic acid, a hyaluronic acid salt (e.g., sodium hyaluronate or the like), and a hyaluronic acid gel. In the cosmetic composition according to an embodiment of the present invention, although there is no limitation on the type of hydrogel, a hydrogel obtained by dispersing a gelling polymer in a polyhydric alcohol is preferably used. The gelling polymer may be at least one selected from the group consisting of a pluronic, purified agar, agarose, gellan gum, alginic acid, carrageenan, cassia gum, xanthan gum, galactomannan, glucomannan, pectin, cellulose, guar gum, and locust bean gum, and the polyhydric alcohol may be at least one selected from the group consisting of ethylene glycol, propylene glycol, 1,3-butylene glycol, isobutylene glycol, dipropylene glycol, sorbitol, xylitol, and glycerin.

In addition, the cosmetic composition for improving skin conditions according to the present invention may further include one or more cosmetically acceptable carriers that are mixed in a general skin cosmetic, and for example, an oil, water, a surfactant, a moisturizer, a lower alcohol, a thickener, a chelating agent, a pigment, a preservative, a fragrance, or the like may be used as a typical carrier ingredient, but the present invention is not limited thereto.

When the formulation of the present invention is a powder or an aerosol, lactose, talc, silica, aluminum hydroxide, calcium silicate, polyamide powder, or a mixture thereof may be used as the carrier ingredient, and particularly, in the case of an aerosol, a propellant such as chlorofluorohydrocarbon, propane/butane, or dimethyl ether may be further included.

When the formulation of the present invention is a cream or a gel, animal fiber, vegetable fiber, wax, paraffin, starch, tragacanth, a cellulose derivative, polyethylene glycol, silicone, bentonite, silica, talc, zinc oxide, or the like may be used as the carrier ingredient.

When the formulation of the present invention is a solution or an emulsion among liquid formulations, a solvent, a solvating agent, or an emulsifying agent may be used as the carrier ingredient, and for example, water, ethanol, isopropanol, ethyl carbonate, ethyl acetate, benzyl alcohol, benzyl benzoate, propylene glycol, 1,3-butyl glycol oil, glycerol aliphatic esters, polyethylene glycol, or fatty acid esters of sorbitan may be used.

When the formulation of the present invention is a suspension among liquid formulations, a liquid diluent such as water, ethanol, or propylene glycol, a suspending agent such as ethoxylated isostearyl alcohol, polyoxyethylene sorbitol esters, or polyoxyethylene sorbitan esters, microcrystalline cellulose, aluminum metahydroxide, bentonite, agarose, or tragacanth may be used as the carrier ingredient.

Another aspect of the present invention provides a non-therapeutic cosmetic method of improving the skin of a mammal, which includes applying the above cosmetic composition for improving skin conditions to the skin of a mammal.

The mammal may be a human, a dog, a cat, a rodent, a horse, a cattle, a monkey, or a pig, but the present invention is not limited thereto.

In the cosmetic method according to the present invention, skin condition improvement refers to a positive change in the appearance and feel of skin tissue, which can be visually and/or tactilely perceived. For example, skin condition improvement may refer to skin elasticity improvement, skin wrinkle improvement, skin texture improvement, skin tone improvement, skin brightness improvement, skin regeneration, skin moisturizing, and/or skin whitening.

In the present invention, the application of a cosmetic composition for improving skin conditions to the skin of a mammal may include: (a) directly applying the cosmetic composition for improving skin conditions to the skin of a mammal; (b) bringing a patch, a facial mask, or a sheet mask applied or saturated with the cosmetic composition in contact with the skin of a mammal or attaching the patch, the facial mask, or the sheet mask to the skin of a mammal; or sequentially performing steps (a) and (b). In step (a), the cosmetic composition may be in the form of a lotion or a cream.

In addition, the cosmetic method according to the present invention may further include step (c) removing the patch, the facial mask, or the sheet mask from the skin of the mammal after step (b), and applying the cosmetic composition to the skin of the mammal. In step (c), the cosmetic composition may be in the form of a lotion or a cream.

Advantageous Effects

A cosmetic composition according to the present invention can be usefully used for the purpose of improving skin conditions due to having excellent skin elasticity improvement, skin wrinkle improvement, skin texture improvement, skin tone or skin brightness improvement, skin regeneration, skin moisturizing, and/or skin whitening effects.

MODES OF THE INVENTION

Hereinafter, the present invention will be described in further detail with reference to the following examples.

However, the following examples are only exemplary and the scope of the present invention is not limited thereto. What can be easily inferred by those skilled in the art from the detailed description and examples of the present invention is interpreted as belonging to the scope of the present invention. References cited herein are incorporated herein by reference.

In this specification, a certain part "including" a certain element signifies that the certain part may further include another element instead of excluding the other element unless particularly indicated otherwise.

Example 1: Preparation of *Aureobasidium pullulans*-Derived Exosomes

*Aureobasidium Pullulans* OFY11-1 strain (obtained from KCTC; Accession No. 14158BP), which is an *Aureobasidium pullulans* strain, was cultured by shaking. Afterwards the culture medium (conditioned medium) was pelleted by centrifugation, and *Aureobasidium pullulans* cells were removed.

*Aureobasidium pullulans*-derived exosomes were isolated from the culture medium from which *Aureobasidium pullulans* cells were removed using a tangential flow filtration (TFF).

Figure 1:
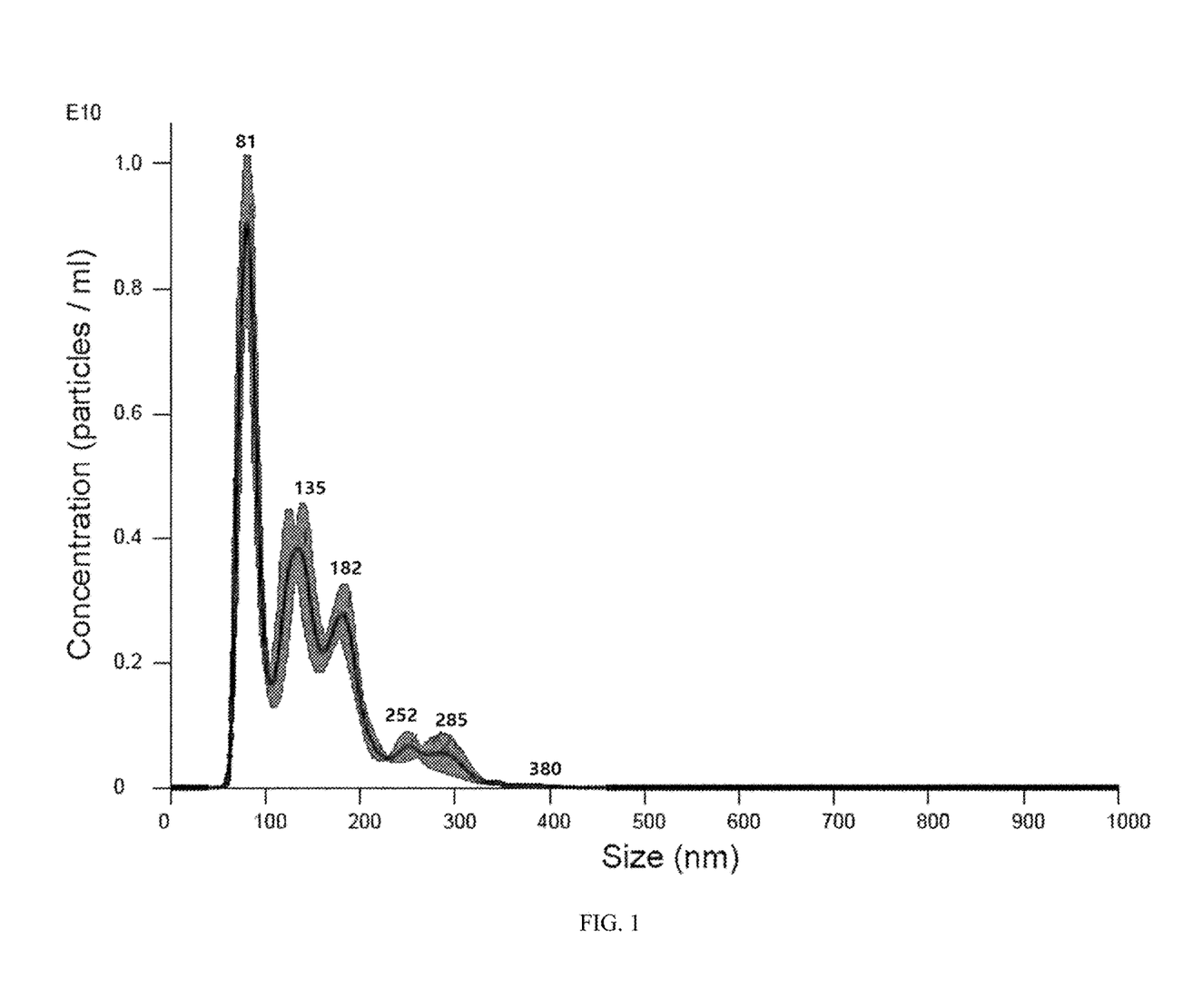
FIG. 1 is a graph showing the particle size distribution and number of particles obtained by nanoparticle tracking analysis (NTA) of *Aureobasidium pullulans*-derived exosomes of the present invention.

The size and concentration of the isolated *Aureobasidium pullulans*-derived exosomes were confirmed by nanoparticle tracking analysis (NTA) using NS300 (purchased from Malvern Panalytical) (FIG. 1).

Example 2: Confirmation of Delivery of *Aureobasidium pullulans*-Derived Exosomes Into Dermal Fibroblast Whether the *Aureobasidium pullulans*-derived exosomes were delivered into human dermal fibroblasts (HDFs; purchased from ATCC) was confirmed as follows.

For fluorescent staining of the membranes of the *Aureobasidium pullulans*-derived exosomes prepared in Example 1, the exosomes were allowed to react with a PKH67 (Sigma-Aldrich) fluorescent dye. After the reaction, the reaction solution was fractionated with a MW3000 (Thermo Fisher) column to remove the free PKH67 fluorescent dye with which the exosome membrane was not stained. As a negative control group, a PKH67 fluorescent dye was allowed to react with a buffer solution and then fractionated with MW3000. The PKH67-stained exosomes were incubated with human dermal fibroblasts prepared by culturing in advance, and then whether the exosomes were delivered into the cells over time was observed using a fluorescence microscope. A Hoechst fluorescent dye (Thermo Fisher) was used for cell nucleus staining, and a CellMask Orange fluorescent dye (Thermo Fisher) was used for cell membrane staining.

As a result of confirming whether the *Aureobasidium pullulans*-derived exosomes were delivered into the cells using a fluorescence microscope, it was confirmed that green fluorescence was accumulated inside the cells over time. From this result, it can be seen that the *Aureobasidium pullulans*-derived exosomes are delivered into the cells (FIG. 2).

Example 3: Confirmation of Effect of *Aureobasidium pullulans*-Derived Exosomes on Promoting Collagen Production Human dermal fibroblasts dispersed in a DMEM medium containing fetal bovine serum (FBS) were dispensed into a 24-well plate at a concentration of $5 \times 10^4$ cells/well and cultured for 24 hours.

Afterward, the *Aureobasidium pullulans* culture medium or *Aureobasidium pullulans*-derived exosomes prepared in Example 1 were diluted in a serum-free medium, and then the human dermal fibroblasts were treated with the same and cultured for 24 hours. In order to confirm the efficacy of collagen production using human dermal fibroblasts, experimental groups were classified as follows:

(1) Negative control group (indicated as "Control" in FIG. 3): an experimental group treated with only a serum-free medium;
(2) Group treated with *Aureobasidium pullulans* culture medium (indicated as "CM" in FIG. 3): an experimental group treated with the *Aureobasidium pullulans* culture medium prepared in Example 1 after dilution in a serum-free medium (treatment concentration based on the number of particles: $3.0 \times 10^9$ particles/mL);
(3) Group treated with low concentration of *Aureobasidium pullulans*-derived exosomes (indicated as "Exosome Low" in FIG. 3): an experimental group treated with a low concentration of the *Aureobasidium pullulans*-derived exosomes prepared in Example 1 after dilution in a serum-free medium (treatment concentration based on the number of particles: $3.0 \times 10^9$ particles/mL); and
(4) Group treated with high concentration of *Aureobasidium pullulans*-derived exosomes (indicated as "Exosome High" in FIG. 3): an experimental group treated with a high concentration of the *Aureobasidium pullulans*-derived exosomes prepared in Example 1 after dilution in a serum-free medium (treatment concentration based on the number of particles: $3.0 \times 10^{10}$ particles/mL).

After the 24-hour culture of human dermal fibroblasts, the culture medium was recovered and centrifuged to prepare a centrifuged culture medium. The amount of collagen, which was synthesized from human dermal fibroblasts and accumulated in the culture medium, was measured using a procollagen type I C-peptide (PIP) EIA kit (purchased from Takara). The relative amount of collagen was determined by performing normalization by dividing the measured collagen amount by the total number of cells, which was measured using an MTT assay kit (purchased from Sigma-Aldrich).

As a result, it can be confirmed that the *Aureobasidium pullulans*-derived exosomes significantly increased collagen synthesis in human dermal fibroblasts compared to the negative control group, and particularly, further increased collagen synthesis as a treatment concentration increased (FIG. 3). In other words, it can be confirmed that the *Aureobasidium pullulans*-derived exosomes of the present invention increased collagen synthesis in human dermal fibroblasts in a concentration-dependent manner.

In addition, it can be confirmed that, under the same concentration (treatment concentration based on the number of particles: $3.0 \times 10^9$ particles/mL), the group treated with a low concentration of the *Aureobasidium pullulans*-derived exosomes produced a larger amount of collagen in human dermal fibroblasts compared to a group treated with an *Aureobasidium pullulans* culture medium (FIG. 3).

Therefore, the cosmetic composition according to the present invention, which includes *Aureobasidium pullulans*-derived exosomes as an active ingredient, has an activity of increasing collagen synthesis, and the *Aureobasidium pullulans*-derived exosomes can be usefully applied as an active ingredient of a functional cosmetic composition for skin wrinkle improvement, skin elasticity improvement, and/or skin regeneration.

Example 4: Confirmation of Delivery of *Aureobasidium pullulans*-Derived Exosomes Into Mouse Melanoma Cell Whether the *Aureobasidium pullulans*-derived exosomes were delivered into mouse melanoma cells (B16F10; purchased from ATCC) was confirmed as follows.

For fluorescent staining of the membranes of the *Aureobasidium pullulans*-derived exosomes prepared in Example 1, the exosomes were allowed to react with a PKH67 fluorescent dye. After the reaction, the reaction solution was fractionated with a MW3000 column to remove the free PKH67 fluorescent dye with which the exosome membrane was not stained. As a negative control group, a PKH67 fluorescent dye was allowed to react with a buffer solution and then fractionated with MW3000. The PKH67-stained exosomes were incubated with B16F10 cells prepared by culturing in advance, and then whether the exosomes were delivered into the cells over time was observed using a fluorescence microscope. A Hoechst fluorescent dye was used for cell nucleus staining, and a CellMask Orange fluorescent dye was used for cell membrane staining.

As a result of confirming whether the *Aureobasidium pullulans*-derived exosomes were delivered into the cells using a fluorescence microscope, it was confirmed that green fluorescence was accumulated inside the cells over time.

Figure 4:
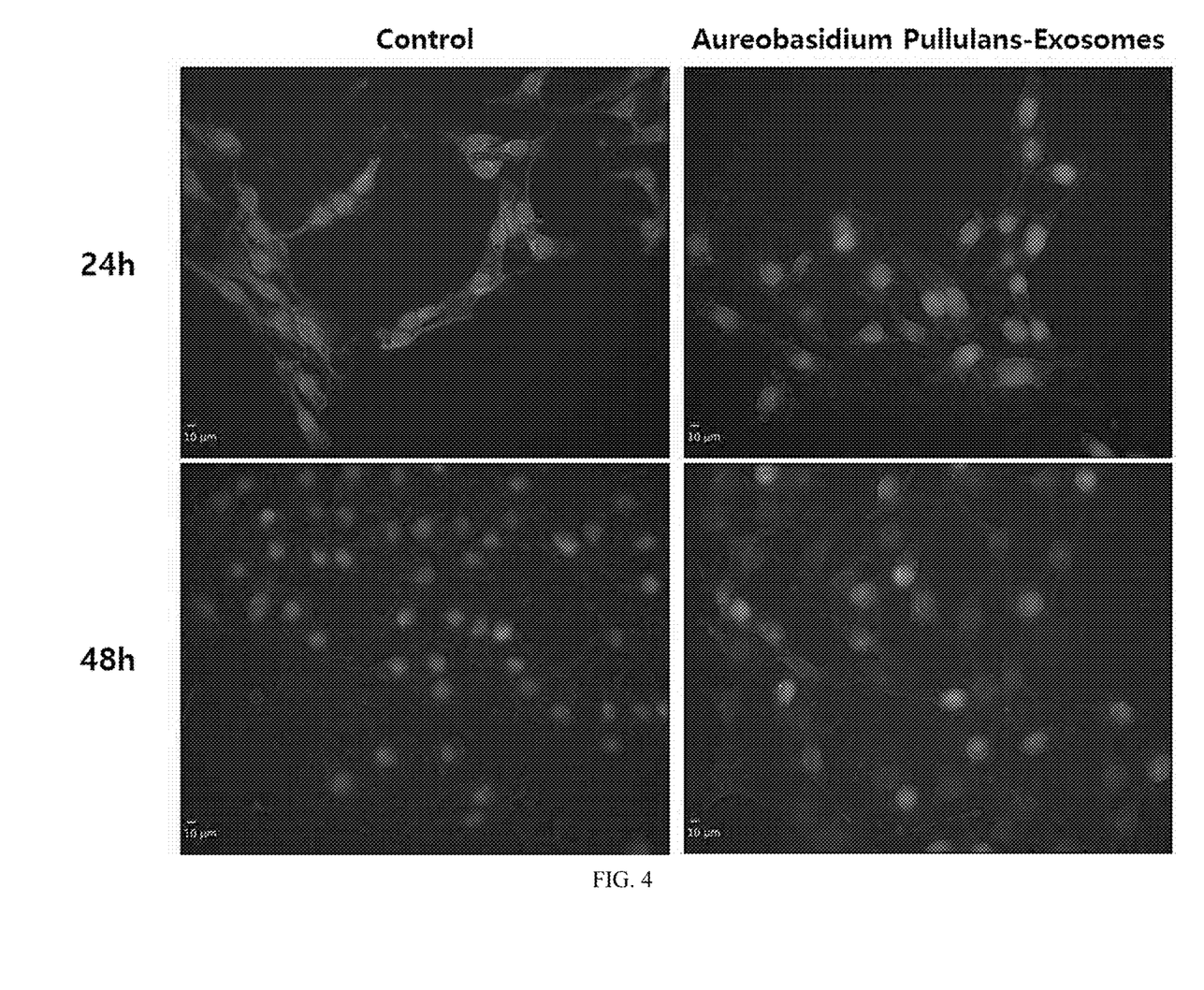
FIG. 4 is a cell fluorescence micrograph showing that fluorescently stained *Aureobasidium pullulans*-derived exosomes are delivered into melanoma cells (green: exosomes delivered into cells, blue: cell nuclei).

From this result, it can be seen that the *Aureobasidium pullulans*-derived exosomes are delivered into the melanoma cells (FIG. 4).

Example 5: Effect of Suppressing Melanin Production

A brightening effect of the *Aureobasidium pullulans*-derived exosomes was confirmed from the degree of suppression of melanin production in melanoma cells. The melanoma cells are cells derived from mouse melanoma and secrete a black pigment called melanin. The melanoma cells were dispensed into a 48-well plate at a concentration of $8 \times 10^3$ cells/well and cultured in a phenol red-free DMEM medium containing 10% fetal bovine serum for 24 hours.

Afterward, the *Aureobasidium pullulans*-derived exosomes prepared in Example 1 were diluted in a culture medium mixed with α-melanocyte stimulating hormone (α-MSH) which is a melanin synthesis stimulant, and then the melanoma cells were treated with the same and cultured for 48 hours. Experimental groups were classified as follows:

(1) Negative control group (indicated as "Negative Control" in FIG. 5): an experimental group treated with a culture medium mixed with α-MSH which is a melanin synthesis stimulant;
(2) Positive control group (indicated as "Positive Control" in FIG. 5): an experimental group treated with a culture medium mixed with α-MSH, which is a melanin synthesis stimulant, and arbutin (final concentration: 1 mM);
(3) Group treated with low concentration of *Aureobasidium pullulans*-derived exosomes (indicated as "Exosome Low" in FIG. 5): an experimental group treated with a culture medium mixed with α-MSH, which is a melanin synthesis stimulant, and a low concentration of the *Aureobasidium pullulans*-derived exosomes (treatment concentration based on the number of particles: $3.0 \times 10^9$ particles/mL); and
(4) Group treated with high concentration of *Aureobasidium pullulans*-derived exosomes (indicated as "Exosome High" in FIG. 5): an experimental group treated with a culture medium mixed with α-MSH, which is a melanin synthesis stimulant, and a high concentration of the *Aureobasidium pullulans*-derived exosomes (treatment concentration based on the number of particles: $3.0 \times 10^{10}$ particles/mL).

After the 48-hour culture of melanoma cells, the culture medium was recovered, and the melanoma cells were washed with a washing solution (PBS; purchased from Thermo Fisher Scientific).

The recovered culture medium was mixed with a CCK-8 assay reagent (purchased from Dojindo Molecular Technologies) and incubated under conditions of 5% $CO_2$ and 37° C. for 2 hours, then the supernatant was transferred to a 96-well plate, and absorbance at 450 nm was measured. Also, the washed melanoma cells were treated with 1 N NaOH (purchased from Merck-Millipore) mixed with 10% DMSO, and the plate was sealed and heated at 85° C. for 20 minutes to extract melanin in the melanoma cells. The absorbance of the extracted melanin was measured at 405 nm, and a melanin amount was calculated.

Figure 5:
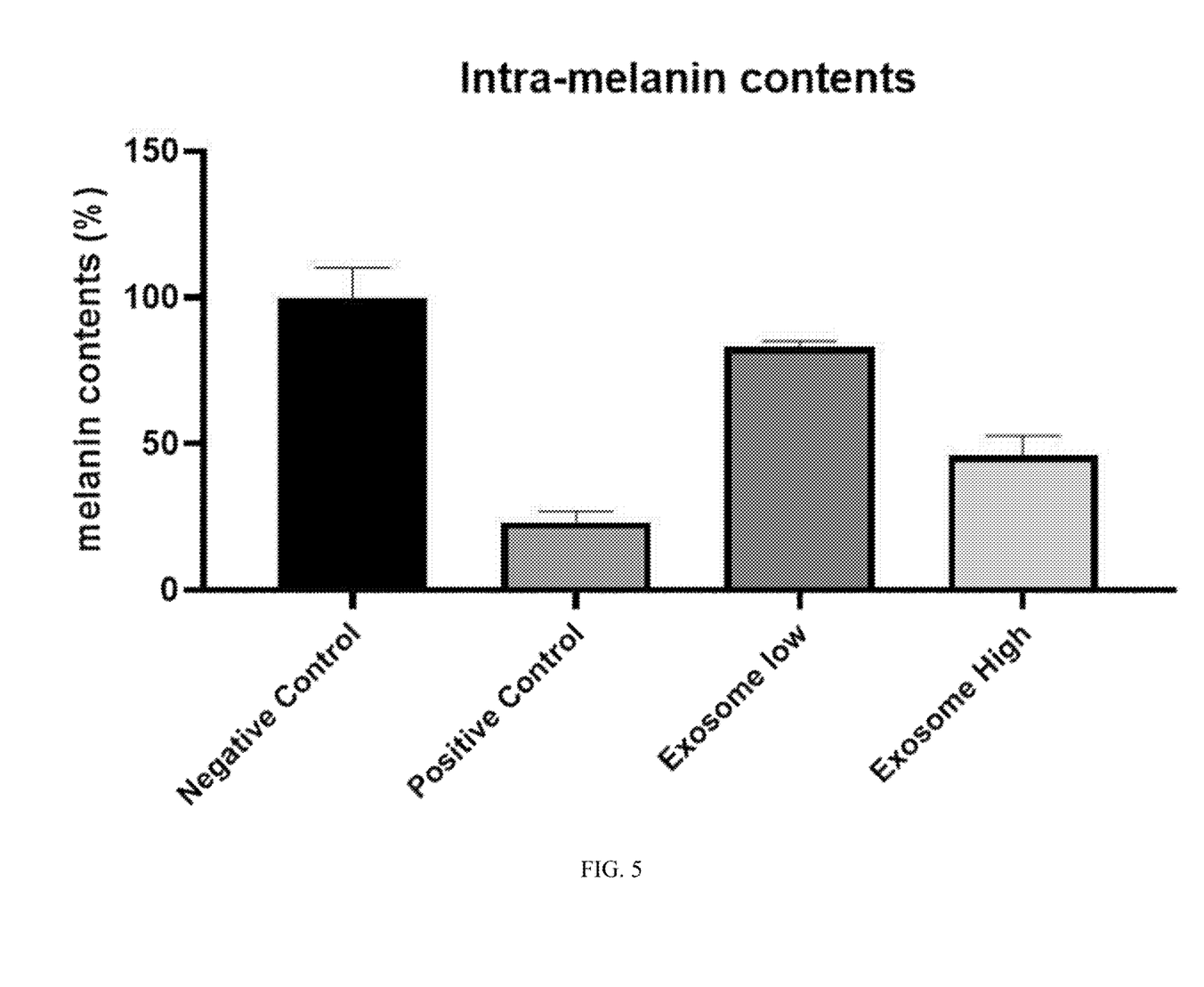
FIG. 5 is a graph showing that a melanin production amount is reduced after treatment of melanoma cells with low and high concentrations of *Aureobasidium pullulans*-derived exosomes.

As a result, it can be confirmed that the *Aureobasidium pullulans*-derived exosomes reduced melanin synthesis in melanoma cells in a concentration-dependent manner (FIG. 5).

Therefore, the cosmetic composition according to the present invention, which includes *Aureobasidium pullulans*-derived exosomes as an active ingredient, has a brightening effect, and the *Aureobasidium pullulans*-derived exosomes can be usefully applied as an active ingredient of a functional cosmetic composition for skin tone or skin brightness improvement and/or skin whitening.

Example 6: Confirmation of Effect of Promoting Hyaluronic Acid Synthetase or Aquaporin Synthesis Human keratinocytes (HaCaT) were dispensed into a 6-well cell culture plate at a concentration of $2 \times 10^5$ cells/well and cultured in a DMEM medium containing 10% fetal bovine serum (FBS) for 24 hours. Afterward, the medium was replaced with a DMEM medium not containing 10% FBS and calcium ($Ca^{2+}$), and the cells were treated with *Aureobasidium pullulans*-derived exosomes diluted in the medium for 24 hours. After 24 hours, the cells were recovered and washed with cold phosphate buffered saline (PBS), and total RNA was extracted with RNeasy mini kit (Qiagen, Germany). Reverse transcription was performed with a cDNA synthesis kit (PhileKorea, Korea) using the extracted RNA as a template to synthesize cDNA. The synthesized cDNA was quantified and then diluted with water, and the same amount was used in all reactions. TaqMan® Universal Master Mix II and TaqMan® Gene Expression Assays (Thermo Fisher, USA), and HAS2 primers (ID: Hs00193435_m1) and AQP3 primers (ID: HS01105469_G1) were used. Real-time quantitative PCR was performed using a StepOnePlus® real-time PCR system (Applied Biosystems, USA).

The experimental results were shown after calculation by the ΔΔCt method based on glyceraldehyde-3-phosphate dehydrogenase (GAPDH) which is a housekeeping gene. The mRNA expression level of the negative control group not treated with the *Aureobasidium pullulans*-derived exosomes was set to about 1.0, and the expression levels of hyaluronan synthase 2 (HAS2) and aquaporin 3 (AQP3) genes in each experimental group were quantified based on the expression level of the negative control group (Tables 1 and 2).

TABLE 1

HAS2 mRNA expression level

| Samples | HAS2 mRNA expression level |
|---|---|
| Untreated group | 1.00 |
| Group treated with *Aureobasidium pullulans*-derived exosomes ($5.45 \times 10^7$ particles/ml) | 1.53 |
| Group treated with *Aureobasidium pullulans*-derived exosomes ($5.45 \times 10^9$ particles/ml) | 3.01 |

TABLE 2

AQP3 mRNA expression level

| Samples | AQP3 mRNA expression level |
|---|---|
| Untreated group | 1 |
| Group treated with *Aureobasidium pullulans*-derived exosomes ($5.45 \times 10^7$ particles/ml) | 1.35 |
| Group treated with *Aureobasidium pullulans*-derived exosomes ($5.45 \times 10^9$ particles/ml) | 4.51 |

As a result of measuring the expression level of the hyaluronic acid synthetase HAS2 gene according to treatment with the *Aureobasidium pullulans*-derived exosomes, as shown in Table 1, it was confirmed that, when the *Aureobasidium pullulans*-derived exosomes were treated, HAS2 gene expression was increased in a concentration-dependent manner compared to the group not treated with the *Aureobasidium pullulans*-derived exosomes, and HAS2 gene expression was increased up to 3 fold.

In addition, as a result of measuring the expression level of the transmembrane protein aquaporin 3 (AQP3) gene according to treatment with the *Aureobasidium pullulans*-derived exosomes, as shown in Table 2, it was confirmed that, when the *Aureobasidium pullulans*-derived exosomes were treated, AQP3 gene expression was increased in a concentration-dependent manner compared to the group not treated with the *Aureobasidium pullulans*-derived exosomes, and AQP3 gene expression was increased up to 4.5 fold.

Therefore, the cosmetic composition according to the present invention, which includes *Aureobasidium pullulans*-derived exosomes as an active ingredient, has a skin moisturizing effect by an increase in hyaluronic acid or aquaporin synthesis, and the *Aureobasidium pullulans*-derived exosomes can be usefully applied as an active ingredient of a cosmetic composition for skin moisturizing.

The present invention has been described with reference to the above embodiments, but is not limited thereto. It should be understood by those skilled in the art that modifications and alterations may be made without departing from the spirit and scope of the present invention and these modifications and alterations are also included in the present invention.

The invention claimed is:

1. A method of improving a skin condition in a subject in need thereof, comprising applying a composition comprising *Aureobasidium pullulans*-derived exosomes as an active ingredient to the skin of the subject.

2. The method of claim 1, wherein the improvement of skin condition is selected from the group consisting of skin elasticity improvement, skin wrinkle improvement, skin texture improvement, skin tone improvement, skin brightness improvement, skin regeneration, skin moisturizing, and skin whitening.

3. The method of claim 1, wherein the subject is a human being, a dog, a cat, a rodent, a horse, a cattle, a monkey, or a pig.

4. The method of claim 1, wherein the application of the composition to the skin comprises:
   (a) directly applying the composition to the skin;
   (b) bringing a patch, a facial mask, or a sheet mask applied or saturated with the composition in contact with the skin or attaching the patch, the facial mask, or the sheet mask to the skin; or
   sequentially performing the steps (a) and (b).

5. The method of claim 4, wherein the composition in step (a) is a cosmetic composition in the form of a lotion or a cream.

6. The method of claim 4, further comprising (c), after step (b), removing the patch, the facial mask, or the sheet mask from the skin, and applying the composition to the skin.

7. The method of claim 6, wherein the composition in step (c) is a cosmetic composition in the form of a lotion or a cream.

8. The method of claim 1, wherein the *Aureobasidium pullulans*-derived exosomes are isolated from an *Aureobasidium pullulans* culture medium, an *Aureobasidium pullulans* fermentation product, or a biological solution of *Aureobasidium pullulans* equivalent thereto.

9. The method of claim 1, wherein the composition is a cosmetic composition selected from the group consisting of a lotion, a liquid, a cream, a saturated mask, a gel, an aerosol, and a powder compositions.

10. The method of claim 1, wherein the composition is applied to or saturated into at least one surface of a patch, a facial mask, or a sheet mask.

11. The method of claim 2, wherein the subject is a human being, a dog, a cat, a rodent, a horse, a cattle, a monkey, or a pig.

12. The method of claim 2, wherein the application of the composition to the skin comprises:
   (a) directly applying the composition to the skin;
   (b) bringing a patch, a facial mask, or a sheet mask applied or saturated with the composition in contact with the skin or attaching the patch, the facial mask, or the sheet mask to the skin; or
   sequentially performing the steps (a) and (b).

13. The method of claim 12, wherein the composition in step (a) is a cosmetic composition in the form of a lotion or a cream.

14. The method of claim 12, further comprising (c), after step (b), removing the patch, the facial mask, or the sheet mask from the skin, and applying the composition to the skin.

15. The method of claim 14, wherein the composition in step (c) is a cosmetic composition in the form of a lotion or a cream.

\* \* \* \* \*